United States Patent
Chen et al.

(10) Patent No.: US 9,947,280 B2
(45) Date of Patent: Apr. 17, 2018

(54) TFT ARRAY SUBSTRATE

(71) Applicant: Shenzhen China Star Optoelectronics Technology Co., Ltd., Shenzhen, Guangdong (CN)

(72) Inventors: Caiqin Chen, Guangdong (CN); Jehao Hsu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/712,472

(22) Filed: Sep. 22, 2017

(65) Prior Publication Data

US 2018/0012554 A1    Jan. 11, 2018

Related U.S. Application Data

(62) Division of application No. 14/423,974, filed on Feb. 25, 2015.

(51) Int. Cl.
*G09G 3/36* (2006.01)
*G02F 1/1362* (2006.01)
*G02F 1/1368* (2006.01)
*G09G 3/3225* (2016.01)

(52) U.S. Cl.
CPC ......... *G09G 3/3648* (2013.01); *G02F 1/1368* (2013.01); *G02F 1/136286* (2013.01); *G09G 3/3225* (2013.01); *G09G 3/3614* (2013.01); *G09G 3/3674* (2013.01); *G09G 2300/0408* (2013.01); *G09G 2300/0426* (2013.01)

(58) Field of Classification Search
None
See application file for complete search history.

(56) References Cited

U.S. PATENT DOCUMENTS

| | | | | |
|---|---|---|---|---|
| 8,773,419 B2 * | 7/2014 | Nam | ............... | G09G 3/3648 345/204 |
| 2008/0079678 A1 * | 4/2008 | Cho | ............... | G09G 3/3648 345/88 |
| 2008/0266218 A1 * | 10/2008 | Su | ............... | G02F 1/13624 345/87 |

* cited by examiner

*Primary Examiner* — Christopher Kohlman
(74) *Attorney, Agent, or Firm* — Andrew C. Cheng (57) ABSTRACT

A thin-film transistor (TFT) array substrate is provided. The TFT array substrate is structured to change the way that sub-pixels are arranged so that during a displaying period of a frame of image, the sub-pixels that have inconsistent brightness/darkness become alternate with each other spatially so that a displaying defect of vertical bright/dark lines can be improved and the overall resistance of the data line can be reduced to thereby reduce resistance-capacitance delay and prevent incorrect charging at a tail end of a scan line or a data line.

4 Claims, 7 Drawing Sheets

TFT ARRAY SUBSTRATE

CROSS REFERENCE TO RELATED APPLICATIONS

This is a divisional application of co-pending patent application Ser. No. 14/423,974, filed on Feb. 25, 2015, which is a national stage of PCT Application Number PCT/CN2014/090461, filed on Nov. 6, 2014, claiming foreign priority of Chinese Patent Application Number 201410568377.7, filed on Oct. 22, 2014.

BACKGROUND OF THE INVENTION

1. Field of the Invention

The present invention relates to the field of displaying technology, and in particular to a TFT (Thin-Film Transistor) array substrate.

2. The Related Arts

In the field of displaying technology, flat panel displays, such as liquid crystal displays (LCDs) and organic light-emitting diodes (OLEDs) have gradually taken the place of cathode ray tube (CRT) displays for wide applications in liquid crystal televisions, mobile phones, personal digital assistants (PDAs), digital cameras, computer monitors, and notebook computer screens.

A display panel is a major component of the LCDs and OLEDs. Both the LCD display panels and the OLED display panels comprise a thin-film transistor (TFT) array substrate. The TFT array substrate comprises a plurality of red (R), green (G), and blue (B) sub-pixels arranged in an array and a plurality of scan lines and a plurality of data lines. Each of the sub-pixels receives a scan signal from a corresponding scan line and a data signal from a corresponding data line in order to display an image.

Figure 1:
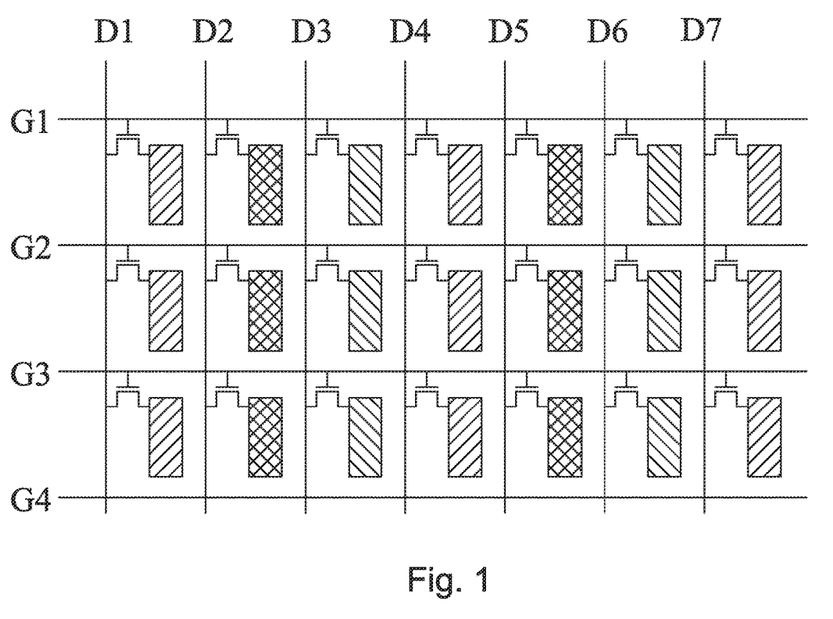
FIG. 1 is a schematic view showing a structure of a conventional thin-film transistor (TFT) array substrate.

FIG. 1 is a schematic view showing a conventional TFT array substrate. The conventional TFT array substrate comprises a plurality of vertical data lines that is arranged in order and parallel to each other, such as D1, D2, D3, D4, D5 and so on, and a plurality of horizontal scan line that is arranged in order and parallel to each other, such as G1, G2, G3, G4, G5 and so on, and sub-pixels that are arranged in an array. The sub-pixels that are arranged on the same row are each electrically connected via a TFT to the scan line located above the row of sub-pixels. For example, each of the sub-pixels that constitute a first row is electrically connected via a TFT to the scan line G1; each of the sub-pixels that constitute a second row is electrically connected via a TFT to the scan line G2; and so on. The sub-pixels that are arranged on the same column is electrically connected via a TFT to the data line located leftward of the column of sub-pixels. For example, each of the sub-pixels that constitute a first column is electrically connected via a TFT to the data line D1; each of the sub-pixels that constitute a second column is electrically connected via a TFT to the data line D2; and so on.

Figure 2:
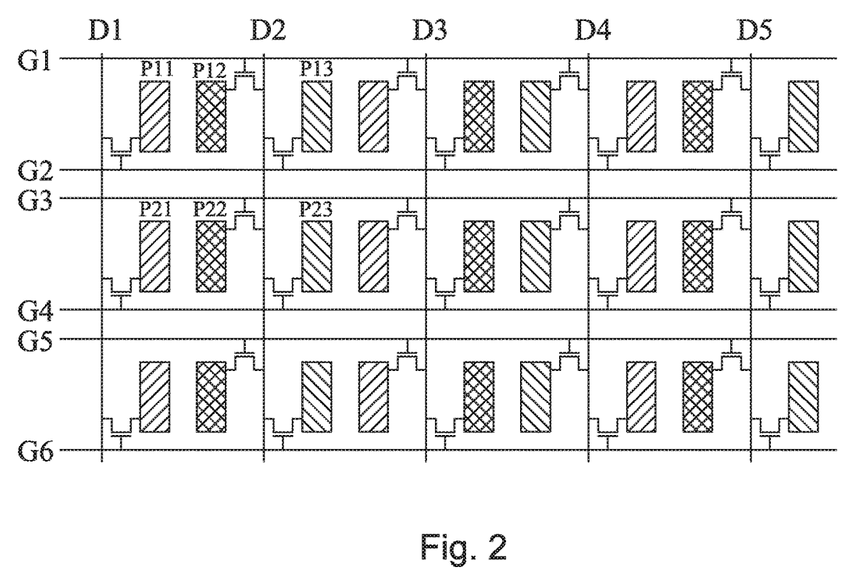
FIG. 2 is a schematic view showing a structure of a conventional data line share (DLS) TFT array substrate.

FIG. 2 is a schematic view showing a conventional data line share (DLS) TFT array substrate. The DLS TFT array substrate comprises data lines each corresponding two columns of sub-pixels and two scan lines respectively arranged above and below each row of sub-pixels. For sub-pixels of each row, a sub-pixel of an even column and a sub-pixel of an odd-column that are respectively located on left and right sides of each data line are each electrically connected by a TFT to the data line, namely sharing the same data line. Also, for sub-pixels of each row, each of the sub-pixels of even columns is electrically connected by a TFT to the scan line above the row of the sub-pixels and each of the sub-pixels of odd columns is electrically connected by a TFT to the scan line below the row of the sub-pixels. For example, a second row and a third row of sub-pixels share the data line D2; a fourth row and a fifth row of sub-pixels share data line D3, and so on. Each of the sub-pixels of the first row that are in even columns is electrically connected by a TFT to the scan line G1 above the first row of sub-pixels and each of the sub-pixels of the first row that are in odd columns is electrically connected by a TFT to the scan line G2 below the first row of sub-pixels; each of the sub-pixels of the second row that are in even columns is electrically connected by a TFT to the scan line G3 above the second row of sub-pixels and each of the sub-pixels of the second row that are in odd columns is electrically connected by a TFT to the scan line G4 below the second row of sub-pixels, and so on. Compared to the traditional TFT array substrate shown in FIG. 1, the DLS TFT array substrate allows for reduction of the number of data lines by half and thus reduction of the cost; however, the number of scan lines is doubled so that the charging time that each sub-pixel may have is reduced by half due to the doubled number of scan lines and thus delays of signals in the corresponding data lines and scan lines would be more prominent. For example, at a tail end of a data line (or a scan line), the delay in the data line (or the scan line) could cause difference in charging rates between sub-pixels of the odd row and the sub-pixel of the even rows, and consequently, display defects of vertical bright and dark lines may result.

Figure 3:
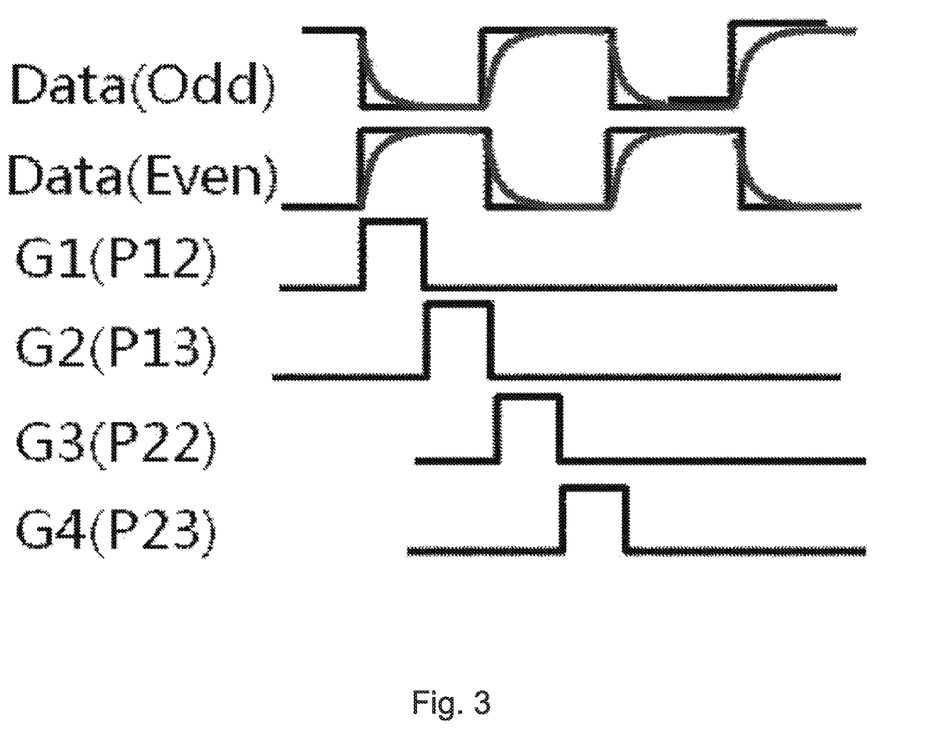
FIG. 3 is a view illustrating wave forms of data signals of FIG. 2.
Figure 4:
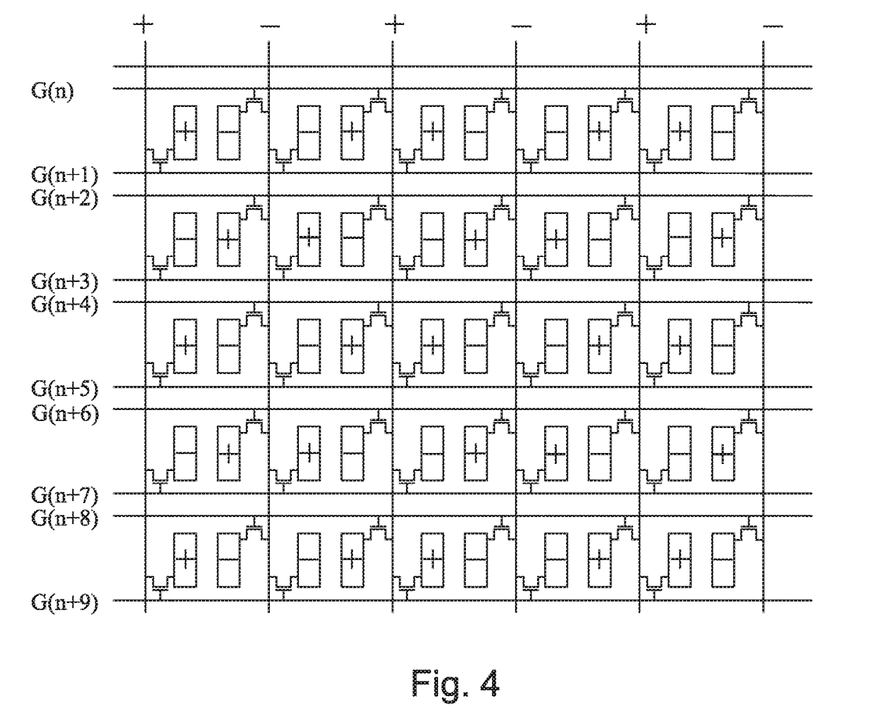
FIG. 4 is a schematic view illustrating two dots polarity reverse for a data line driving method of the DLS TFT array substrate.

Specifically, reference is now made collectively to FIGS. 2, 3, and 4. As shown in FIG. 4, the manner of driving data lines is that polarity is reversed for every two dots. Due to RC delay, the data signals are not ideal square waves and the wave forms of the actual signals are wave forms with curved edges as shown in FIG. 3. For a specific sub-pixel Pxy, where x indicates the x-th row and y indicates the y-th column, such as sub-pixel P12 shown in FIG. 2 indicating a sub-pixel of the second column in the first row, when scan lines G1, G2, G3, and G4 are sequentially conducted on, the odd-column sub-pixels that are connected a data line are sequentially driven earlier than the odd-column sub-pixels. For example, sub-pixels P12, P13, P22, P23 that are connected to the data line D2 are driven in that sequence. In the period of the same polarity of the data signal, the sub-pixel that is driven later is better charged than that driven earlier. As such, P13 is better charged than P12 and P23 is better charged than P22. After the reverse of polarity of the data signal, the driving sequence maintains the same, namely the odd-column sub-pixels are driven first and then the odd-column sub-pixels are driven. As such, the even-column sub-pixels that are driven first may suffer being insufficiently charged so that the site corresponding to the even-column sub-pixels become insufficiently bright, making the overall displaying effect showing a defect of vertical bright and dark lines.

SUMMARY OF THE INVENTION

An object of the present invention is to provide a thin-film transistor (TFT) array substrate, wherein within a displaying period of a frame of image, the sub-pixels that have inconsistent brightness/darkness are alternate with each other spatially so that a displaying defect of vertical bright/dark lines is improved and since the overall resistance of a data line is reduced, resistance-capacitance delay is reduced so as to prevent incorrect charging at a tail end of a scan line or a data line.

To achieve the above object, the present invention provides a TFT array substrate, which comprises: a plurality of data lines, a plurality of scan lines, and a plurality of sub-pixels arranged in an array;

in each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane;

each of the data lines being electrically connected to two sub-pixels of each of the sub-pixel rows that are located on left side and right side of the data line respectively by TFTs and supplying data signals to the two sub-pixels;

two scan lines being provided, corresponding to and located at upper and lower sides of each of the sub-pixel rows; the nth scan line and the (n')th scan line being respectively located on the upper and lower sides of the nth sub-pixel row; the (n+1)th scan line and the (n'+1)th scan line being respectively located on the upper and lower sides of the (n+1)th sub-pixel row, n being a positive integer, so that the nth sub-pixel row and the (n+1)th sub-pixel row collectively form a repeatable circuit formation unit;

the nth scan line being electrically connected via TFTs to and driving the sub-pixels of even pairs in the nth sub-pixel row and the (n')th scan line being electrically connected via TFTs to and driving the sub-pixels of odd pairs in the nth sub-pixel row; and the (n+1)th scan line being electrically connected via TFTs to and driving the sub-pixels of odd pairs in the (n+1)th sub-pixel row and the (n'+1)th scan line being electrically connected via TFTs to and driving the sub-pixels of even pairs in the (n+1)th sub-pixel row; whereby in the nth sub-pixel row, the sub-pixels of even pairs are driven earlier than the sub-pixels of odd pairs and in the (n+1)th sub-pixel row, the sub-pixels of even pairs are driven later than the sub-pixels of odd pairs.

The data lines are driven in a manner of reversing polarity for every two dots.

During a display period of a frame of image, in the pairs of sub-pixels between two adjacent data lines, the nth sub-pixel row and the (n+1)th sub-pixel row show an arrangement of alternating darkness and brightness.

A TFT array substrate comprises: a plurality of data lines, a plurality of scan lines, and a plurality of sub-pixels arranged in an array;

in each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane;

each of the data lines being electrically connected to two sub-pixels of each of the sub-pixel rows that are located on left side and right side of the data line respectively by TFTs and supplying data signals to the two sub-pixels;

two scan lines being provided, corresponding to and located at upper and lower sides of each sub-pixel row; the nth scan line and the (n')th scan line being respectively located on the upper and lower sides of the nth sub-pixel row; the (n+1)th scan line and the (n'+1)th scan line being respectively located on the upper and lower sides of the (n+1)th sub-pixel row; the (n+2)th scan line and the (n'+2)th scan line being respectively located on the upper and lower sides of the (n+2)th sub-pixel row; and the (n+3)th scan line and the (n'+3)th scan line being respectively located on the upper and lower sides of the (n+3)th sub-pixel row, n being a positive integer, so that the nth sub-pixel row, the (n+1)th sub-pixel row, the (n+2)th sub-pixel row, and the (n+3)th sub-pixel row collectively form a repeatable circuit formation unit;

the nth scan line being electrically connected via TFTs to and driving the sub-pixels of even pairs in the nth sub-pixel row and the (n')th scan line being electrically connected via TFTs to and driving the sub-pixels of odd pairs in the nth sub-pixel row; the (n+1)th scan line being electrically connected via TFTs to and driving the sub-pixels of even pairs in the (n+1)th sub-pixel row and the (n'+1)th scan line being electrically connected via TFTs to and driving the sub-pixels of odd pairs in the (n+1)th sub-pixel row; the (n+2)th scan line being electrically connected via TFTs to and driving the (n+2)th the sub-pixels of odd pairs in sub-pixel row and the (n'+2)th scan line being electrically connected via TFTs to and driving the sub-pixels of even pairs of the (n+2)th sub-pixel row; and the (n+3)th scan line being electrically connected via TFTs to and driving the sub-pixels of odd pairs of the (n+3)th sub-pixel row and the (n'+3)th scan line being electrically connected via TFTs to and driving the sub-pixels of even pairs of the (n+3)th sub-pixel row; whereby in the nth and (n+1)th sub-pixel rows, the sub-pixels of even pairs are driven earlier than the sub-pixels of odd pairs; and in the (n+2)th and (n+3)th sub-pixel rows, the sub-pixels of even pairs are driven later than the sub-pixels of odd pairs.

The data lines are driven in a manner of reversing polarity for every two dots.

During a display period of a frame of image, in the pairs of sub-pixels between two adjacent data lines, the nth and (n+1)th sub-pixel rows and the (n+2)th and (n+3)th sub-pixel rows show an arrangement of alternating darkness and brightness.

The efficacy of the present invention is that the present invention provides a TFT array substrate, which changes the way that sub-pixels are arranged so that during a displaying period of a frame of image, the sub-pixels that have inconsistent brightness/darkness become alternate with each other spatially so that a displaying defect of vertical bright/dark lines can be improved and the overall resistance of the data line can be reduced to thereby reduce resistance-capacitance delay and prevent incorrect charging at a tail end of a scan line or a data line.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 5:
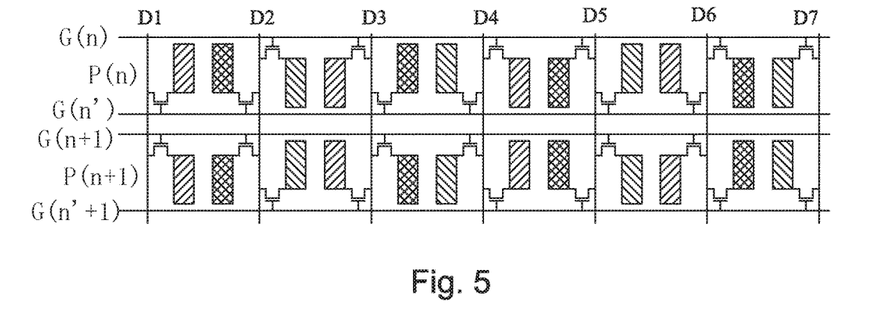
FIG. 5 is a schematic view showing a TFT array substrate according to a first embodiment of the present invention.

Referring to FIG. 5, a schematic view is given to illustrate a thin-film transistor (TFT array substrate) according to a first embodiment of the present invention. The TFT array substrate comprises: a plurality of data lines, such as D1, D2, D3, D4, D5, D6, D7, a plurality of scan lines, and a plurality of sub-pixels arranged in an array.

In each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane.

Each of the data lines is electrically connected to two sub-pixels of each sub-pixel row that are located on left side and right side of the data line respectively by TFTs and supplies data signals to the two sub-pixels.

Two scan lines are provided, corresponding to and located at upper and lower sides of each sub-pixel row. The nth scan line $G(n)$ and the (n')th scan line $G(n')$ are respectively located on the upper and lower sides of the nth sub-pixel row $P(n)$; the (n+1)th scan line $G(n+1)$ and the (n'+1)th scan line $G(n'+1)$ are respectively located on the upper and lower sides of the (n+1)th sub-pixel row $P(n+1)$, n being a positive integer, so that the nth sub-pixel row $P(n)$ and the (n+1)th sub-pixel row $P(n+1)$ collectively form a repeatable circuit formation unit, namely the entirety of a circuit being formed by repeatedly arranging the circuit formation unit. For example, the first sub-pixel row and the second sub-pixel row form a circuit formation unit and the third and fourth sub-pixel rows form a repeatable circuit formation unit, and so on.

The nth scan line $G(n)$ is electrically connected via TFTs to and drives the sub-pixels of even pairs in the nth sub-pixel row $P(n)$ and the (n')th scan line $G(n')$ is electrically connected via TFTs to and drives the sub-pixels of odd pairs in the nth sub-pixel row $P(n)$; and the (n+1)th scan line $G(n+1)$ is electrically connected via TFTs to and drives the sub-pixels of odd pairs in the (n+1)th sub-pixel row $P(n+1)$ and the (n'+1)th scan line $G(n'+1)$ is electrically connected via TFTs to and drives the sub-pixels of even pairs in the (n+1)th sub-pixel row $P(n+1)$.

When the scan lines are sequentially turned on from top to bottom, the sub-pixels of even pairs in the nth sub-pixel row $P(n)$ are driven earlier than the sub-pixels of odd pairs so that the sub-pixels of odd pairs of the nth sub-pixel row are provided with a better effect of charging than the sub-pixels of even pairs, whereby the sub-pixels of odd pairs in the nth sub-pixel row become brighter while the sub-pixels of even pairs are darker; and in the (n+1)th sub-pixel row $P(n+1)$, the sub-pixels of even pairs are driven later than the sub-pixels of odd pairs so that the sub-pixels of even pairs of the (n+1)th sub-pixel row are provided with a better effect of charging than the sub-pixels of odd pairs, whereby the sub-pixels of odd pairs in the (n+1)th sub-pixel row become darker while the sub-pixels of even pairs are brighter.

Figure 7:
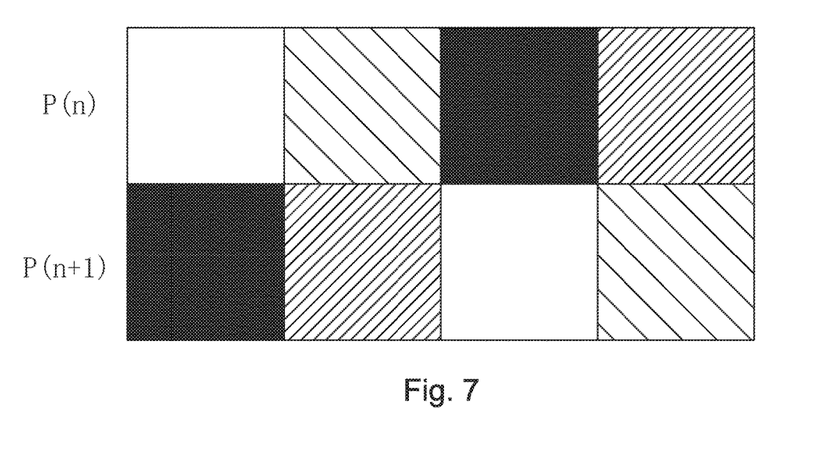
FIG. 7 is a schematic view illustrating the distribution of brightness and darkness of sub-pixels of the TFT array substrate according to the first embodiment of the present invention.

The data lines are driven in a manner of reversing polarity for every two dots. After the reverse of polarity of the data signals, the driving sequence remains unchanged so that eventually, during the displaying period of a frame of image, in the pairs of sub-pixels between two adjacent data lines, the nth sub-pixel row $P(n)$ and the (n+1)th sub-pixel row $P(n+1)$ show an arrangement of alternating "dark" and "bright", as shown in FIG. 7. In view of the overall displaying effect, the sub-pixels that have inconsistent brightness/darkness become alternate with each other spatially so that a displaying defect of vertical bright/dark lines can be improved. Further, the overall resistance of the data line can be reduced to thereby reduce resistance-capacitance delay and prevent incorrect charging at a tail end of a scan line or a data line.

Figure 6:
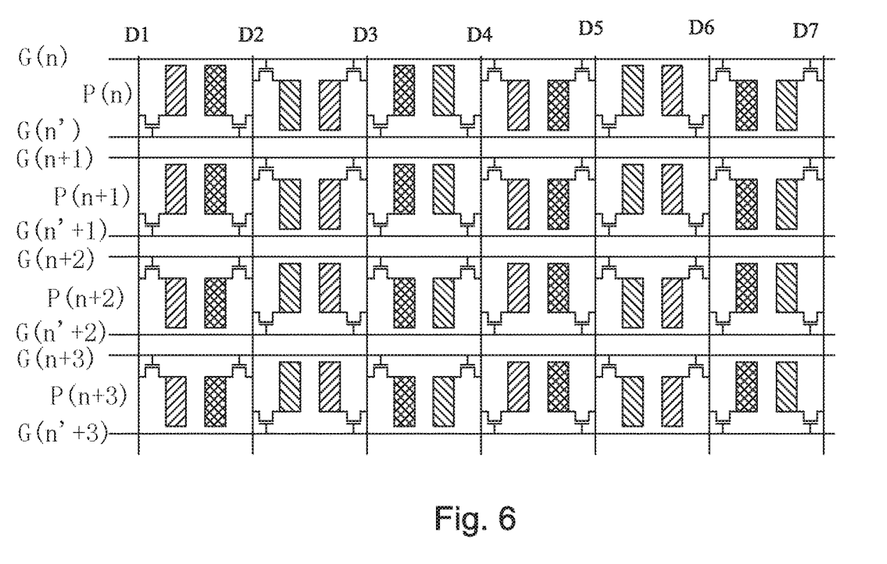
FIG. 6 is a schematic view showing a TFT array substrate according to a second embodiment of the present invention.

Referring to FIG. 6, a schematic view is given to illustrate a TFT array substrate according to a second embodiment of the present invention. The TFT array substrate comprises:

a plurality of data lines, a plurality of scan lines, and a plurality of sub-pixels arranged in an array.

In each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane.

Each of the data lines is electrically connected to two sub-pixels of each sub-pixel row that are located on left side and right side of the data line respectively by TFTs and supplies data signals to the two sub-pixels.

Two scan lines are provided, corresponding to and located at upper and lower sides of each sub-pixel row. The nth scan line $G(n)$ and the (n')th scan line $G(n')$ are respectively located on the upper and lower sides of the nth sub-pixel row $P(n)$; the (n+1)th scan line $G(n+1)$ and the (n'+1)th scan line $G(n'+1)$ are respectively located on the upper and lower sides of the (n+1)th sub-pixel row $P(n+1)$; the (n+2)th scan line $G(n+2)$ and the (n'+2)th scan line $G(n'+2)$ are respectively located on the upper and lower sides of the (n+2)th sub-pixel row $P(n+2)$; and the (n+3)th scan line $G(n+3)$ and the (n'+3)th scan line $G(n'+3)$ are respectively located on the upper and lower sides of the (n+3)th sub-pixel row $P(n+3)$, n being a positive integer, so that the nth sub-pixel row $P(n)$, the (n+1)th sub-pixel row $P(n+1)$, the (n+2)th sub-pixel row $P(n+2)$, and the (n+3)th sub-pixel row $P(n+3)$ collectively form a repeatable circuit formation unit, namely the entirety of a circuit being formed by repeatedly arranging the circuit formation unit. For example, the first, second, third, and fourth sub-pixel rows form a circuit formation unit and the fifth, sixth, seventh, and eighth sub-pixel rows form a repeatable circuit formation unit, and so on.

The nth scan line $G(n)$ is electrically connected via TFTs to and drives the sub-pixels of even pairs in the nth sub-pixel row $P(n)$ and the (n')th scan line $G(n')$ is electrically connected via TFTs to and drives the sub-pixels of odd pairs in the nth sub-pixel row $P(n)$; the (n+1)th scan line $G(n+1)$ is electrically connected via TFTs to and drives the sub-pixels of even pairs in the (n+1)th sub-pixel row $P(n+1)$ and the (n'+1)th scan line $G(n'+1)$ is electrically connected via TFTs to and drives the sub-pixels of odd pairs in the (n+1)th sub-pixel row $P(n+1)$; the (n+2)th scan line $G(n+2)$ is electrically connected via TFTs to and drives the (n+2)th the sub-pixels of odd pairs in sub-pixel row $P(n+2)$ and the (n'+2)th scan line $G(n'+2)$ is electrically connected via TFTs to and drives the sub-pixels of even pairs of the (n+2)th sub-pixel row P(n+2); and the (n+3)th scan line G(n+3) is electrically connected via TFTs to and drives the sub-pixels of odd pairs of the (n+3)th sub-pixel row P(n+3) and the (n'+3)th scan line G(n'+3) is electrically connected via TFTs to and drives the sub-pixels of even pairs of the (n+3)th sub-pixel row P(n+3).

When the scan lines are sequentially turned on from top to bottom, the sub-pixels of even pairs in the nth and (n+1)th sub-pixel rows P(n), P(n+1) are driven earlier than the sub-pixels of odd pairs so that the sub-pixels of odd pairs of the nth and (n+1)th sub-pixel rows are provided with a better effect of charging than the sub-pixels of even pairs, whereby the sub-pixels of odd pairs in the nth and (n+1)th sub-pixel rows become brighter while the sub-pixels of even pairs are darker; and in the (n+2)th and (n+3)th sub-pixel rows P(n+2), P(n+3), the sub-pixels of even pairs are driven later than the sub-pixels of odd pairs so that the sub-pixels of even pairs of the (n+2)th and (n+3)th sub-pixel rows are provided with a better effect of charging than the sub-pixels of odd pairs, whereby the sub-pixels of odd pairs in the (n+2)th and (n+3)th sub-pixel rows become darker while the sub-pixels of even pairs are brighter.

Figure 8:
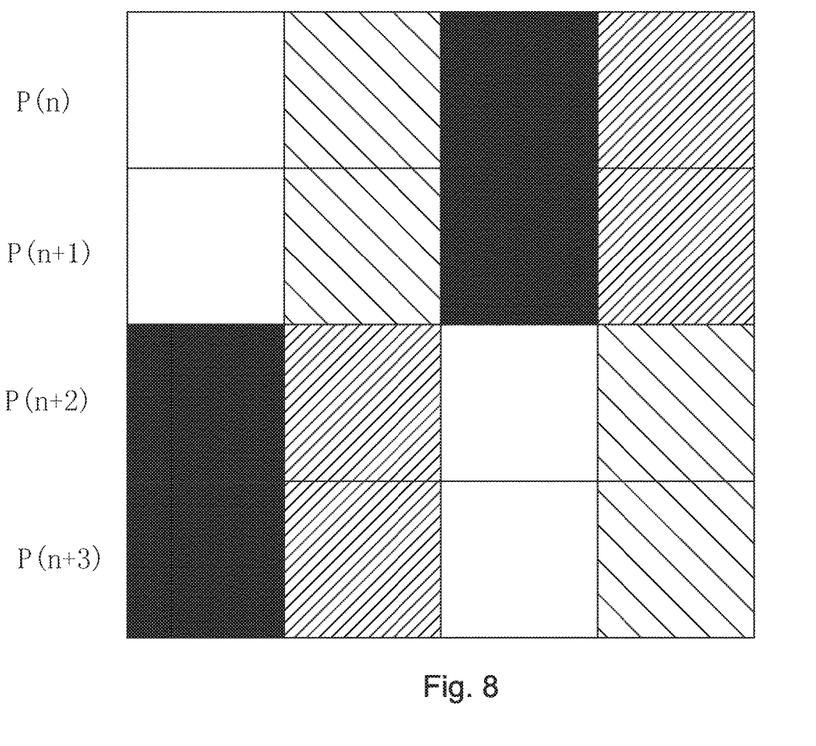
FIG. 8 is a schematic view illustrating the distribution of brightness and darkness of sub-pixels of the TFT array substrate according to the second embodiment of the present invention.

The data lines are driven in a manner of reversing polarity for every two dots. After the reverse of polarity of the data signals, the driving sequence remains unchanged so that eventually, during the displaying period of a frame of image, in the pairs of sub-pixels between two adjacent data lines, the nth and (n+1)th sub-pixel rows P(n), P(n+1) and the (n+2)th and (n+3)th sub-pixel rows P(n+2), P(n+3) show an arrangement of alternating "dark" and "bright", as shown in FIG. 8. In view of the overall displaying effect, the sub-pixels that have inconsistent brightness/darkness become alternate with each other spatially so that a displaying defect of vertical bright/dark lines can be improved. Further, the overall resistance of the data line can be reduced to thereby reduce resistance-capacitance delay and prevent incorrect charging at a tail end of a scan line or a data line.

In summary, the present invention provides a TFT array substrate, which changes the way that sub-pixels are arranged so that during a displaying period of a frame of image, the sub-pixels that have inconsistent brightness/darkness become alternate with each other spatially so that a displaying defect of vertical bright/dark lines can be improved and the overall resistance of the data line can be reduced to thereby reduce resistance-capacitance delay and prevent incorrect charging at a tail end of a scan line or a data line.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A thin-film transistor (TFT) array substrate, comprising: a plurality of data lines, a plurality of scan lines, and a plurality of sub-pixels arranged in an array;
   in each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane;
   each of the data lines being electrically connected to two sub-pixels of each of the sub-pixel rows that are located on left side and right side of the data line respectively by TFTs and supplying data signals to the two sub-pixels;
   two scan lines being provided, corresponding to and located at upper and lower sides of each sub-pixel row; the nth scan line and the (n')th scan line being respectively located on the upper and lower sides of the nth sub-pixel row; the (n+1)th scan line and the (n'+1)th scan line being respectively located on the upper and lower sides of the (n+1)th sub-pixel row; the (n+2)th scan line and the (n'+2)th scan line being respectively located on the upper and lower sides of the (n+2)th sub-pixel row; and the (n+3)th scan line and the (n'+3)th scan line being respectively located on the upper and lower sides of the (n+3)th sub-pixel row, n being a positive integer, so that the nth sub-pixel row, the (n+1)th sub-pixel row, the (n+2)th sub-pixel row, and the (n+3)th sub-pixel row collectively form a repeatable circuit formation unit;
   the nth scan line being electrically connected via TFTs to and driving the sub-pixels of even pairs in the nth sub-pixel row and the (n')th scan line being electrically connected via TFTs to and driving the sub-pixels of odd pairs in the nth sub-pixel row; the (n+1)th scan line being electrically connected via TFTs to and driving the sub-pixels of even pairs in the (n+1)th sub-pixel row and the (n'+1)th scan line being electrically connected via TFTs to and driving the sub-pixels of odd pairs in the (n+1)th sub-pixel row; the (n+2)th scan line being electrically connected via TFTs to and driving the (n+2)th the sub-pixels of odd pairs in sub-pixel row and the (n'+2)th scan line being electrically connected via TFTs to and driving the sub-pixels of even pairs of the (n+2)th sub-pixel row; and the (n+3)th scan line being electrically connected via TFTs to and driving the sub-pixels of odd pairs of the (n+3)th sub-pixel row and the (n'+3)th scan line being electrically connected via TFTs to and driving the sub-pixels of even pairs of the (n+3)th sub-pixel row; whereby in the nth and (n+1)th sub-pixel rows, the sub-pixels of even pairs are driven earlier than the sub-pixels of odd pairs; and in the (n+2)th and (n+3)th sub-pixel rows, the sub-pixels of even pairs are driven later than the sub-pixels of odd pairs;
   wherein in each sub-pixel row, two consecutive pairs of sub-pixels are arranged among three consecutive data lines that comprise a first data line, a second data line, and a third data line sequentially arranged in a forward direction along the row, and the two consecutive pairs comprises, sequentially arranged in the forward direction, a first pair of which two sub-pixels are located between the first and second data lines and a second pair of which two sub-pixels are located between the second data line and the third data line, wherein a first one of the two sub-pixels of the first pair is located beside and connected to the first data line, a second one of the two sub-pixels of the second pair is located beside and connected to the third data line, and a second one of the two sub-pixels of the first pair and the first one of the two sub-pixels of the second pair are located beside and connected to the second data line, and are respectively arranged on two opposite sides of the second data line, wherein the first and second sub-pixels of the first pair are both connected to a first one of the two scan lines that are located on the upper and lower sides of the sub-pixel row and the first and second sub-pixels of the second pair are both connected to a second one of the two scan lines; and wherein in each of the sub-pixel rows, each of the data lines is connected to two of the sub-pixels of the row that are respectively located on two opposite sides of the data line and are immediately adjacent to the data line and wherein among four consecutive sub-pixel rows comprising the nth, (n+1)th, (n+2)th, and (n+3)th sub-pixel rows, for the first and second ones of the four consecutive rows, the sub-pixels of an odd pair are both connected to the scan line on the lower side of the row and the sub-pixels of an even pair are both connected to the scan line on the upper side of the row, while for the third and four ones of the four consecutive rows, the sub-pixels of an odd pair are both connected to the scan line on the upper side of the row and the sub-pixels of an even pair are both connected to the scan line on the lower side of the row.

2. The TFT array substrate as claimed in claim 1, wherein the data lines are driven in a manner of reversing polarity for every two dots.

3. The TFT array substrate as claimed in claim 1, wherein during a display period of a frame of image, in the pairs of sub-pixels between two adjacent data lines, the nth and (n+1)th sub-pixel rows and the (n+2)th and (n+3)th sub-pixel rows show an arrangement of alternating darkness and brightness.

4. A thin-film transistor (TFT) array substrate, comprising: a plurality of data lines, a plurality of scan lines, and a plurality of sub-pixels arranged in an array;

in each row of the sub-pixels, a pair of sub-pixels that are arranged between two adjacent ones of the data lines are in alignment with each other and in each row of the sub-pixels, an odd pair of sub-pixels and an even pair of sub-pixels that are adjacent to each other are staggered laterally on a plane;

each of the data lines being electrically connected to two sub-pixels of each of the sub-pixel rows that are located on left side and right side of the data line respectively by TFTs and supplying data signals to the two sub-pixels;

two scan lines being provided, corresponding to and located at upper and lower sides of each sub-pixel row; the nth scan line and the (n')th scan line being respectively located on the upper and lower sides of the nth sub-pixel row; the (n+1)th scan line and the (n'+1)th scan line being respectively located on the upper and lower sides of the (n+1)th sub-pixel row; the (n+2)th scan line and the (n'+2)th scan line being respectively located on the upper and lower sides of the (n+2)th sub-pixel row; and the (n+3)th scan line and the (n'+3)th scan line being respectively located on the upper and lower sides of the (n+3)th sub-pixel row, n being a positive integer, so that the nth sub-pixel row, the (n+1)th sub-pixel row, the (n+2)th sub-pixel row, and the (n+3)th sub-pixel row collectively form a repeatable circuit formation unit;

the nth scan line being electrically connected via TFTs to and driving the sub-pixels of even pairs in the nth sub-pixel row and the (n')th scan line being electrically connected via TFTs to and driving the sub-pixels of odd pairs in the nth sub-pixel row; the (n+1)th scan line being electrically connected via TFTs to and driving the sub-pixels of even pairs in the (n+1)th sub-pixel row and the (n'+1)th scan line being electrically connected via TFTs to and driving the sub-pixels of odd pairs in the (n+1)th sub-pixel row; the (n+2)th scan line being electrically connected via TFTs to and driving the (n+2)th the sub-pixels of odd pairs in sub-pixel row and the (n'+2)th scan line being electrically connected via TFTs to and driving the sub-pixels of even pairs of the (n+2)th sub-pixel row; and the (n+3)th scan line being electrically connected via TFTs to and driving the sub-pixels of odd pairs of the (n+3)th sub-pixel row and the (n'+3)th scan line being electrically connected via TFTs to and driving the sub-pixels of even pairs of the (n+3)th sub-pixel row; whereby in the nth and (n+1)th sub-pixel rows, the sub-pixels of even pairs are driven earlier than the sub-pixels of odd pairs; and in the (n+2)th and (n+3)th sub-pixel rows, the sub-pixels of even pairs are driven later than the sub-pixels of odd pairs;

wherein the data line are driven in a manner of reversing polarity for every two dots; and wherein during a display period of a frame of image, in the pairs of sub-pixels between two adjacent data lines, the nth and (n+1)th sub-pixel rows and the (n+2)th and (n+3)th sub-pixel rows show an arrangement of alternating darkness and brightness;

wherein in each sub-pixel row, two consecutive pairs of sub-pixels are arranged among three consecutive data lines that comprise a first data line, a second data line, and a third data line sequentially arranged in a forward direction along the row, and the two consecutive pairs comprises, sequentially arranged in the forward direction, a first pair of which two sub-pixels are located between the first and second data lines and a second pair of which two sub-pixels are located between the second data line and the third data line, wherein a first one of the two sub-pixels of the first pair is located beside and connected to the first data line, a second one of the two sub-pixels of the second pair is located beside and connected to the third data line, and a second one of the two sub-pixels of the first pair and the first one of the two sub-pixels of the second pair are located beside and connected to the second data line, and are respectively arranged on two opposite sides of the second data line, wherein the first and second sub-pixels of the first pair are both connected to a first one of the two scan lines that are located on the upper and lower sides of the sub-pixel row and the first and second sub-pixels of the second pair are both connected to a second one of the two scan lines; and wherein in each of the sub-pixel rows, each of the data lines is connected to two of the sub-pixels of the row that are respectively located on two opposite sides of the data line and are immediately adjacent to the data line and wherein among four consecutive sub-pixel rows comprising the nth, (n+1)th, (n+2)th, and (n+3)th sub-pixel rows, for the first and second ones of the four consecutive rows, the sub-pixels of an odd pair are both connected to the scan line on the lower side of the row and the sub-pixels of an even pair are both connected to the scan line on the upper side of the row, while for the third and four ones of the four consecutive rows, the sub-pixels of an odd pair are both connected to the scan line on the upper side of the row and the sub-pixels of an even pair are both connected to the scan line on the lower side of the row.

* * * * *